US012638289B1

(12) United States Patent
Qian et al.

(10) Patent No.: US 12,638,289 B1
(45) Date of Patent: May 26, 2026

(54) ELECTRIC LIFTING TRIPOD FOR AUTOMATIC LASER TRACKING AND MEASURING SYSTEM THEREOF

(71) Applicant: Changzhou Jinli Optical Instrument Co., Ltd., Changzhou (CN)

(72) Inventors: Wei Qian, Changzhou (CN); Hongbao Zhao, Changzhou (CN)

(73) Assignee: Changzhou Jinli Optical Instrument Co., Ltd., Changzhou (CN)

( * ) Notice: Subject to any disclaimer, the term of this patent is extended or adjusted under 35 U.S.C. 154(b) by 0 days.

(21) Appl. No.: 19/389,169

(22) Filed: Nov. 14, 2025

Related U.S. Application Data

(63) Continuation of application No. PCT/CN2025/093208, filed on May 7, 2025.

(30) Foreign Application Priority Data

| Apr. 21, 2025 | (CN) | 202520756045.5 |
| Apr. 21, 2025 | (CN) | 202520756046.X |
| Apr. 21, 2025 | (CN) | 202520758339.1 |

(51) Int. Cl.
| *G01C 15/00* | (2006.01) |
| *B66F 3/10* | (2006.01) |
| *F16M 11/32* | (2006.01) |

(52) U.S. Cl.
CPC .............. *G01C 15/002* (2013.01); *B66F 3/10* (2013.01); *F16M 11/32* (2013.01); *B66F 2700/04* (2013.01)

(58) Field of Classification Search
CPC .......... B66F 3/10; B66F 3/08; B66F 2700/04; B66F 2700/09; F16M 11/046; F16M 11/28; G01C 15/00–006
See application file for complete search history.

(56) References Cited

U.S. PATENT DOCUMENTS

| 4,137,784 A | * | 2/1979 | Griffin | ...................... B66F 3/44 74/25 |
| 6,494,005 B2 | * | 12/2002 | Zimmerman | ........... B66F 7/025 254/420 |
| 10,414,223 B2 | * | 9/2019 | Drake | ........................ B60S 9/08 |
| 10,823,566 B2 | * | 11/2020 | Lukic | .................... G01J 1/0219 |
| 12,466,707 B1 | * | 11/2025 | Zhang | ........................ B66F 3/02 |

(Continued)

*Primary Examiner* — Tyrone V Hall, Jr.

(74) *Attorney, Agent, or Firm* — Central California IP Group, P.C.; Andrew D. Fortney

(57) ABSTRACT

An electric lifting tripod and measurement system for laser automatic tracking, belonging to the technical field of measurement equipment, includes a suspension assembly, a lifting part, a transmission mechanism and a motor. The suspension assembly has a first internal cavity, an upper end connected to a base, and an adapter hole connected to the first internal cavity. The lower end of the lifting part extends into the first internal cavity through the adapter hole and is connected to the transmission mechanism. The transmission mechanism is connected to a motor. The transmission mechanism includes a lead screw and nut transmission mechanism. The motor is fixed at the lower end of the suspension assembly and drives the lifting part vertically (to rise and fall). The tripod can effectively reduce the shaking of the laser instrument during the lifting and lowering process, thereby significantly improving measurement accuracy.

20 Claims, 11 Drawing Sheets

(56)  References Cited

U.S. PATENT DOCUMENTS

2011/0315834 A1* 12/2011 Lukic ..................... F16M 11/36
                                                   248/125.8
2020/0355316 A1* 11/2020 Shehab ..................... B66F 3/10

* cited by examiner

ELECTRIC LIFTING TRIPOD FOR AUTOMATIC LASER TRACKING AND MEASURING SYSTEM THEREOF

CROSS-REFERENCE TO RELATED APPLICATIONS

This application is a continuation of International Pat. Appl. No. PCT/CN2025/093208, filed on May 7, 2025, which claims the benefit of Chinese Pat. Appl. Nos. 202520758339.1, 202520756045.5 and 202520756046.X, each of which was filed on Apr. 21, 2025, all of which are incorporated herein by reference as if fully set forth herein.

TECHNICAL FIELD

The present invention relates to the field of measuring equipment technology, specifically to an electric lifting tripod for automatic laser tracking and a measuring system including the same.

BACKGROUND DISCUSSION

In the construction industry, construction surveying is applied throughout the entire construction process, from site leveling, building positioning, foundation construction, to the installation of building components. The prior art typically employs a measurement system consisting of a tripod, a laser instrument (also known as a laser device, laser level, or laser line projector), and a receiver (or laser receiver) for high-precision measurements of distance, height, or shape. The tripod serves as the supporting structure for the entire system, fixing the laser instrument and/or receiver to ensure stable position and orientation during measurement, thus maximizing accuracy. The laser instrument emits one or more laser beams, which possess high directionality and stability. By adjusting the angle and position of the laser instrument, the laser beams can be directed towards the target object or reference point whose height needs to be measured. The receiver primarily receives the laser signals emitted by the laser instrument, and its configuration usually includes a prompting module to provide appropriate alerts upon receiving a laser signal, such as through sound or light.

In the prior art, electric tripods (or electric lifting tripods) are commonly used for measurement work. For ease of operation, these electric tripods are usually equipped with remote controls, allowing the measuring personnel to remotely control the tripod. For example, the measuring devices disclosed in Chinese patent no. CN216432949U are all controlled by remote controls. In practice, when the measuring personnel see or hear a prompt from the receiver, they can use the remote control to stop the electric tripod's operation, achieving the purpose of measurement or calibration. For example, as shown in FIG. 1, when performing height measurement or calibration, it is usually necessary to first place the tripod 1 in a suitable position and level it, and then install a laser generator 8 to produce laser light on top of the lifting mechanism of the tripod 1. Simultaneously, a receiver 9 is positioned at the location requiring measurement or calibration. This receiver 9 can be mounted on another tripod, a wall, shelf, or the object being measured. Typically, the receiver 9 is located away from the laser instrument 8, as shown in FIG. 1. During measurement, the operator holds the remote control and stands close to the receiver 9. Using the remote control, the operator adjusts the tripod's lifting mechanism to vertically position the laser instrument 8, ensuring its laser beam is detectable by the receiver 9. When the receiver 9 detects the laser, a prompt module alerts the operator. Following the prompt, the operator uses the remote control to position the laser instrument 8 at a location where the laser beam is detectable, thus achieving the measurement or calibration purpose.

In the prior art, traditional electric tripods typically use a motor to control the lifting mechanism with racks. For example, Chinese patent no. CN203309468U discloses an electric tripod where the motor is located in the guide housing for mounting the legs. To ensure sufficient lifting stroke, the motor can only be installed in the upper half of the lifting mechanism, resulting in a high center of gravity for the entire electric tripod. In actual use, the laser instrument rises along with the lifting mechanism, further raising the center of gravity of the tripod. This causes instability during the lifting process, leading to wobbling of the laser instrument and affecting measurement accuracy. Therefore, in existing technologies, additional counterweights are often suspended at the bottom of the lifting mechanism to improve the stability of the tripod during lifting. This not only makes the structure of the electric tripod heavier and more complex, but also makes the on-site measurement process more cumbersome.

SUMMARY

A first aspect of the present invention addresses the aforementioned technical problems by providing an electric lifting tripod that effectively reduces laser instrument sway during the lifting process, thereby significantly improving measurement accuracy. The main concept is as follows:

An electric lifting tripod for automatic laser tracking includes a base and a plurality of retractable legs, each leg being rotatably connected to the base. The base has an adapter hole extending therethrough (e.g., through upper and lower ends thereof). The tripod also includes a suspension assembly, a lifting part, a transmission mechanism, and a motor. The suspension assembly has a first internal cavity extending therethrough (e.g., through upper and lower ends thereof). The upper end of the suspension assembly is connected to the base, and the adapter hole communicates with the first internal cavity. The lifting part has an upper end that extends above the base via the adapter hole to support the laser instrument. The lifting part has a lower end that extends into the first internal cavity via the adapter hole and is connected to the transmission mechanism. The transmission mechanism is connected to the motor and includes a lead screw and nut transmission mechanism. The motor is fixed to the lower end of the suspension assembly and drives the lifting part vertically (e.g., to move up and down).

In this solution, on the one hand, by configuring a suspension assembly and constructing a second internal cavity that runs through both the upper and lower ends of the suspension assembly, a transmission mechanism and/or a motor can be installed in the second internal cavity. This not only makes the structure of the entire electric tripod more compact and provides protection, but also reduces the problem of dust and impurities affecting the smoothness of the lifting part (e.g., the movement thereof) and the transmission accuracy of the transmission mechanism due to environmental factors. Furthermore, it makes the center of mass of the electric tripod closer to or coincident with the geometric center of the tripod, thereby effectively reducing the swaying caused by lifting the lifting part (e.g., moving or driving the lifting part upwards).

On the other hand, by connecting the upper end of the suspension assembly to the base, the suspension assembly is suspended below the base, and by fixing the motor to the lower end of the suspension assembly, the motor is lower and may be relatively heavy. This lowers the center of gravity of the entire electric tripod and keeps it at a lower position, effectively reducing the swaying caused by lifting the lifting part and significantly improving the stability of the tripod during lifting, especially when the lifting part is raised to a high position, effectively reducing the swaying of the laser instrument. Through the synergy of these two aspects, in actual measurement scenarios, this tripod can still guarantee or achieve higher measurement accuracy without the addition of counterweights. At the same time, it simplifies the structure of the tripod, makes the on-site measurement process simpler, and is suitable for laser automatic tracking applications.

Furthermore, by configuring a lead screw and nut transmission mechanism in the electric tripod and connecting the motor to the lifting part through the lead screw and nut transmission mechanism, the motor can drive the lifting part to move up and down through the lead screw and nut transmission mechanism. This not only achieves the purpose of adjusting the position of the laser instrument in a vertical or attitude direction, but also, compared with the traditional gear and rack transmission mechanism, this design can further improve transmission accuracy, thereby improving the measurement accuracy. Moreover, it is beneficial to achieve a self-locking function after reaching the target position, ensuring that the laser instrument can be more stably and reliably maintained at the target position, thus facilitating more stable and reliable measurement.

A second aspect of this invention addresses the problem of further improving measurement accuracy. Preferably, the lead screw and nut transmission mechanism includes a lead screw and a nut. The lead screw is rotatably mounted within the suspension assembly. The nut has a threaded hole adapted to (e.g., that mates with) the lead screw and is threadedly connected to the lead screw through the threaded hole. The nut is in the first internal cavity and is connected to the lifting part within the first internal cavity. The upper end of the lead screw may be in the lifting part, and the motor rotates (e.g., drives rotation of) the lead screw (e.g., at the lower end of the lead screw). This not only allows the lead screw to drive the nut and the lifting part to move vertically and synchronously, but also significantly improves the continuity of the lifting part's movement compared to existing gear and rack transmission mechanisms. Furthermore, it allows the motor to be positioned below the lead screw, achieving a lower-mounted motor, thereby improving the stability of the tripod and effectively enhancing the accuracy of the tripod's control over the laser instrument's movement, thus improving measurement accuracy.

A third aspect of this invention addresses the problem of further improving the stability of the electric tripod. Specifically, the motor's output shaft is coaxial with the lead screw, and the lead screw is also coaxial with the suspension assembly. This positions the motor away from the base and lowers the center of gravity of the entire electric tripod, thus improving its stability. Furthermore, by making the motor's output shaft coaxial with the lead screw and the suspension assembly, it not only improves the stability of the lead screw during rotation, achieving higher precision transmission and measurement accuracy, but also lowers the tripod's center of gravity, aligning it with the geometric center, thereby further enhancing the stability of the electric tripod.

Preferably, the lower end of the lifting part is connected to the nut, and the lifting part and the nut are coaxial. This makes installation and disassembly easier.

Preferably, the nut (e.g., the outside of the nut) includes a small-diameter collar and a large-diameter collar that are coaxial with the threaded hole, and the small-diameter collar is in the lower end of the lifting part. This arrangement ensures that the lifting part and the nut are coaxial, allowing the lifting part to move more smoothly, effectively preventing wobbling and improving measurement accuracy.

Preferably, each leg is evenly distributed along the circumference of the base to provide more stable and reliable support for the base.

Preferably, the suspension assembly includes a cylindrical outer sleeve, the upper end of which is connected to the base. The first internal cavity is in the outer sleeve.

A fourth aspect of this invention addresses the problem of improving the accuracy of lead screw transmission. For example, the lifting part includes an inner cylinder and an outer cylinder connected to the inner cylinder. The inner and outer cylinders are coaxial. The lower end of either the inner or outer cylinder is connected to the nut. The inner diameter of the inner cylinder is larger than the outer diameter of the lead screw. The lead screw is in the inner cylinder, and the inner cylinder may radially limit and/or constrain the lead screw. The lower end of the lead screw is connected to the suspension assembly via a bearing. With this design, the lower end of the lead screw is connected to the suspension assembly via a bearing, and the upper end of the lead screw is in the inner cylinder and is radially limited and/or constrained by the inner cylinder. This prevents significant swaying or swinging of the upper end of the lead screw during lifting, thus promoting greater stability of the lead screw and effectively improving its transmission accuracy, thereby enhancing measurement accuracy.

To prevent the lifting part from swaying during lifting, which could cause measurement errors in the laser instrument mounted on the lifting part, the outer cylinder is further configured with an adapter hole, forming a vertical sliding pair between the outer cylinder and the adapter hole. Alternatively, the outer cylinder may have an outer diameter that accommodates a guide piece in the adapter hole, forming a similar vertical sliding pair between the outer cylinder and the guide piece. Combined with the constraint of the nut on the lifting part, at least two vertical constraints are formed, ensuring the lifting part remains vertical, especially when it extends a considerable distance above the base. This guarantees stability, prevents tilting or swaying, and achieves higher precision vertical lifting movement, thereby effectively improving measurement accuracy.

A fifth aspect of this invention addresses the problem of improving system stability. For example, it includes a housing with a second internal cavity, suspended below the suspension assembly, the second internal cavity communicating with the first internal cavity. The motor is in the second internal cavity. This design not only allows for a lower motor position, improving the stability of the electric tripod, but also effectively protects the motor and allows for the installation of necessary electrical components such as batteries within the shell at a lower position, further lowering the tripod's center of gravity.

Furthermore, it also includes a controller that is in the shell and connected to the motor, so that the lifting part can be precisely raised and lowered via the motor.

Preferably, the shell also has an opening and a cover adapted to and configured to close the opening. A mounting cavity is also inside the shell. A battery is in the mounting cavity that powers the controller and motor. This eliminates the need for external power supply during field use, making the measurement process simpler, more efficient, and more mobile and/or flexible. The configuration of the mounting cavity, the opening, and the cover component not only protects the battery, but may also facilitate battery replacement.

For ease of operation, the shell may further include an operating component that is connected to the controller. This allows the operator to control the power supply and/or the motor via the operating component.

The sixth aspect of this invention addresses the problem of further improving measurement accuracy. Preferably, the suspension assembly further includes a guide protrusion for limiting the rotation of the nut, and the nut has a limiting groove adapted to the guide protrusion. The guide protrusion and the limiting groove may form a vertical sliding pair. By configuring the guide protrusion inside the suspension assembly, not only can the movement of the nut be guided, ensuring that the nut rises and falls strictly in a vertical direction, thus improving measurement accuracy, but also the cooperation between the guide protrusion and the limiting groove can prevent the nut from rotating synchronously with the lead screw.

Preferably, the guide protrusion is oriented along the length of the suspension assembly, and the limiting groove is adapted to (e.g., configured to mate with) the guide protrusion. The guide protrusion and the limiting groove form a sliding pair.

The seventh aspect of this invention addresses the problem of facilitating uninterrupted vertical wiring. For example, the guide protrusion may include first and second opposing baffles, forming a line passage between them. An opening is on the side of the first and second baffles facing away from the suspension assembly, and this opening communicates with the line passage. This design not only allows for convenient vertical wiring through the line passage in the guide protrusion, preventing internal wiring clutter and tangling, but also, through the guide piece between the guide protrusion and the limiting groove, makes the entire structure more compact and simplified, effectively constraining the wires within the line passage and preventing interference with the tripod's lifting and lowering process. Furthermore, this structure makes the guide protrusion easier to mold and especially easy to integrate with the suspension assembly (e.g., using a mold), resulting in high molding precision and a high yield rate.

To address the issue of wires easily detaching and causing wear within the line passage, each of the first and second baffles may bend inward at the opening to form a necking. Alternatively, each of the first and second baffles may have an inward-facing retaining edge at the opening, forming the necking. By creating the necking at the opening, the wires within the line passage are prevented from detaching and contacting the limiting groove. This ensures more stable wiring, avoids interference between the wires and internal components of the suspension assembly, and prevents wear on the wires caused by relative movement between the limiting protrusion and the guide piece, effectively protecting the wires.

An eighth aspect of this invention addresses the problem of completing measurement or calibration work more conveniently, with higher accuracy, and at a lower cost. It provides a measurement system comprising a laser instrument configured to generate laser light, a receiver, and the present electric lifting tripod. The receiver includes a processor, a detector configured to detect the laser light, and a first communication module, with the detector and the first communication module respectively connected to the processor. The electric lifting tripod further includes a second communication module adapted to the first communication module, the second communication module being connected to a controller, and the first communication module communicating with the second communication module. The laser instrument is mounted on the electric lifting tripod, which is configured to adjust the vertical position of the laser instrument.

In this invention, by configuring a first communication module in the receiver and connecting the first communication module to the processor, the receiver can at least send signals outward through the first communication module. By configuring a second communication module in the electric lifting tripod and connecting the second communication module to the controller, the electric lifting tripod can at least receive signals through the second communication module. By adapting the second communication module to the first communication module and enabling the first and second communication modules to communicate with each other, the receiver and the electric lifting tripod can communicate with each other. In actual use, when the receiver's detector detects a laser, the receiver can send a signal to the electric lifting tripod through the first and second communication modules. After receiving the signal, the electric lifting tripod can control the motor to stop rotating in a timely manner according to preset settings, so that the laser instrument stops rising and/or falling, thereby achieving the purpose of measurement or calibration. This design allows the receiver to automatically control the electric lifting tripod to stop during measurement. Firstly, this process requires no manual intervention; the receiver automatically receives, responds to, and controls the tripod, enabling automatic target tracking. This simplifies the measurement process, making it more convenient and unaffected by human experience or reaction speed. It also ensures more precise laser positioning, guaranteeing and improving accuracy. Secondly, the entire process, from detecting the laser signal to the controller stopping the motor, is automated through the cooperation of the receiver and the tripod. This significantly improves response speed compared to manual control, resulting in higher accuracy, and also reduces the overall measurement time, increasing efficiency. Furthermore, this design eliminates the need for complex prompting modules in the receiver, simplifying its structure and reducing costs.

Preferably, the first communication module includes a first wireless communication module, and the second communication module includes a second wireless communication module adapted to the first wireless communication module. By using mutually compatible wireless communication modules for the first and second communication modules, there is no need to configure or connect communication cables at the measurement site. This not only makes the system simpler and more convenient to use, but also eliminates the need for the receiver to bear the weight of the communication cable, allowing the receiver to be more flexibly placed at the location of measurement or calibration.

Alternatively or additionally, the first communication module includes a first wired communication module, and the second communication module includes a second wired communication module adapted to the first wired communication module. By using mutually compatible wired communication modules for the first and second communication modules, the receiver and the electric tripod can be connected via a communication cable at the measurement site. This is particularly suitable for harsh environments and situations with high electromagnetic interference, enabling more stable signal transmission with less delay on-site. This not only improves measurement accuracy but also meets the measurement needs of different occasions, effectively enhancing the system's versatility.

Compared with the prior art, the electric lifting tripod and measurement system provided by the present invention can effectively reduce shaking caused by lifting the lifting part, significantly improve the stability of the tripod during the lifting process, and effectively reduce the shaking of the laser instrument, thereby effectively improving measurement accuracy. Moreover, it can still guarantee or achieve higher measurement accuracy, without the need for counterweights. At the same time, it also simplifies the structure of the tripod, makes the on-site measurement process simpler, and is suitable for laser automatic tracking applications.

DETAILED DESCRIPTION OF EMBODIMENTS

Embodiment 1

Figure 1:
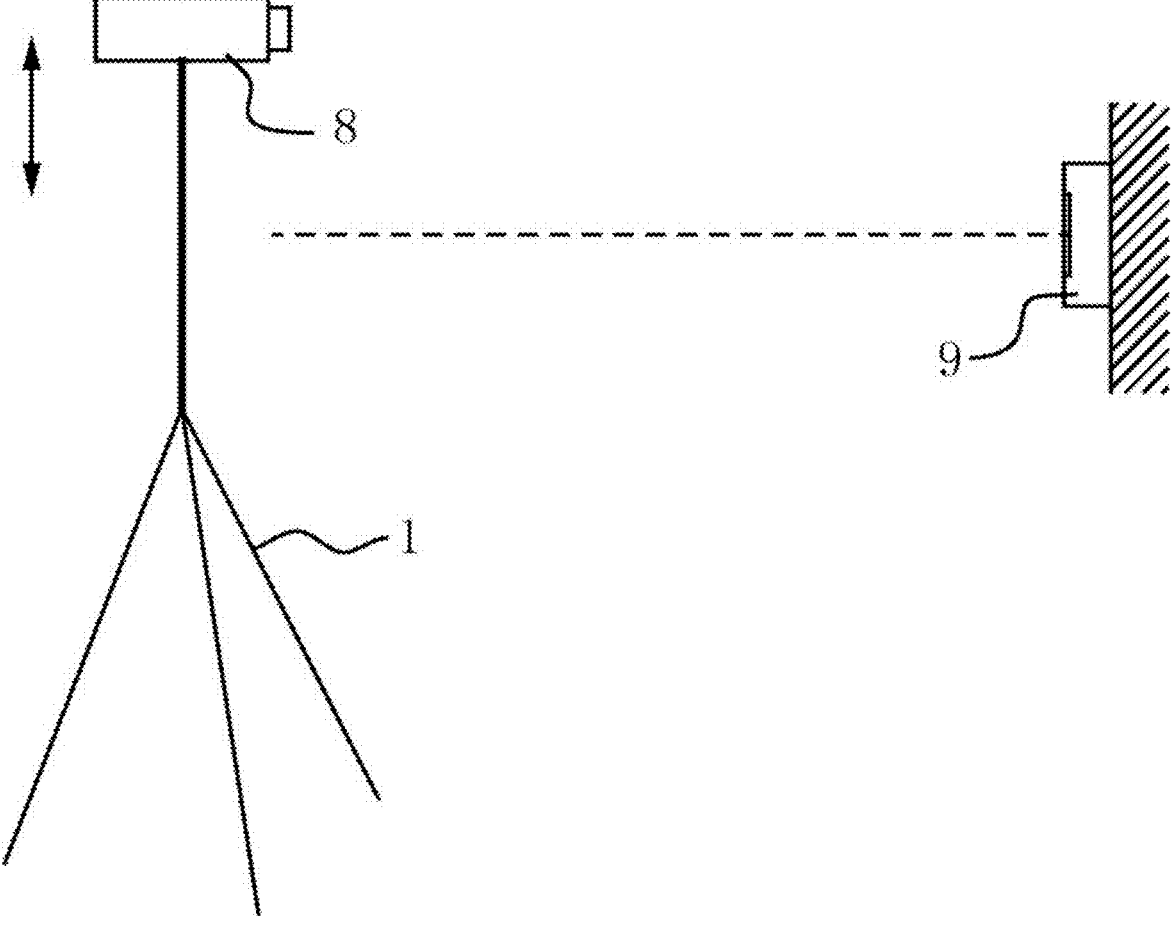
FIG. 1 is a schematic diagram of the use of a prior art measurement system.
Figure 2:
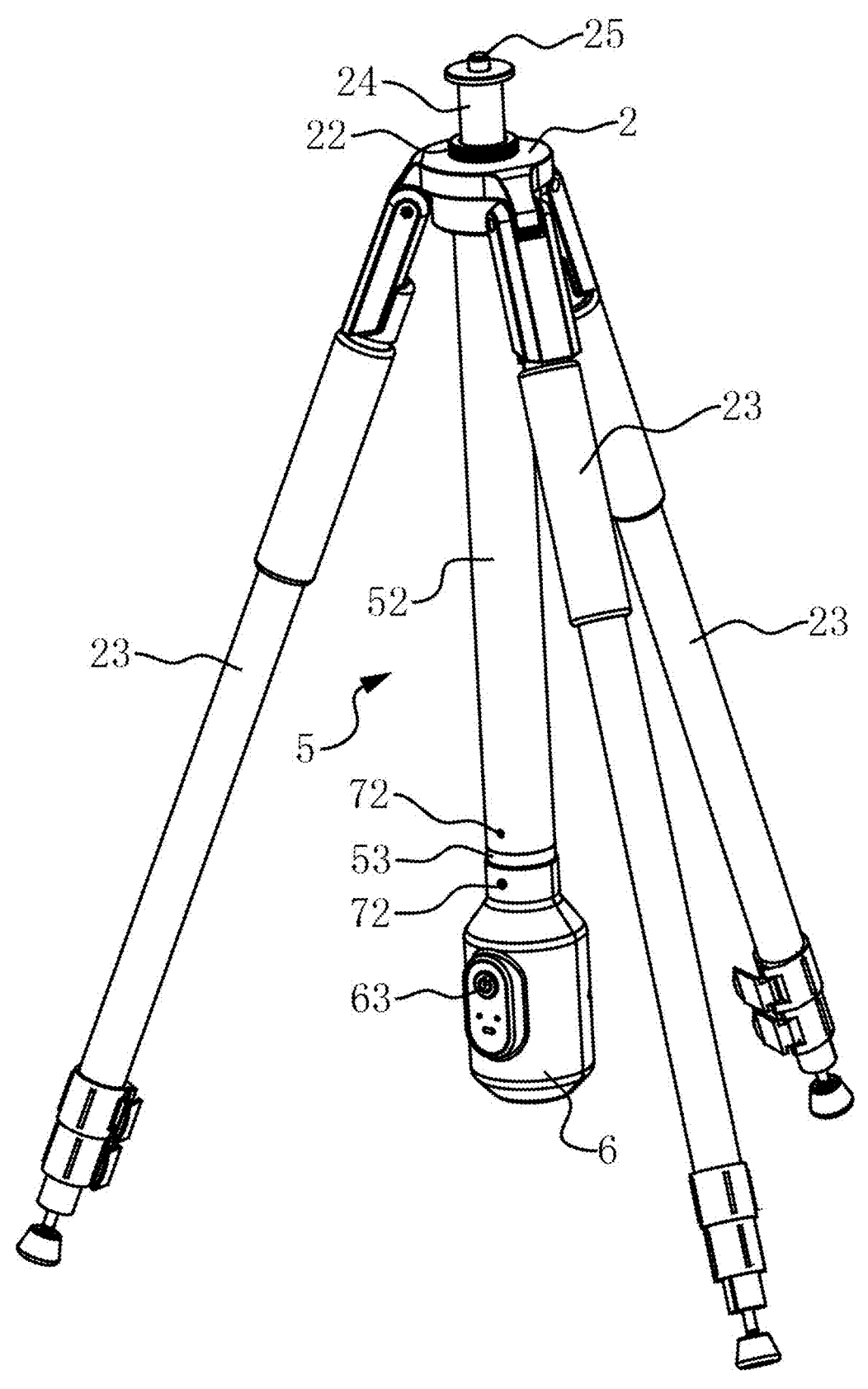
FIG. 2 is a three-dimensional structural diagram of an electric lifting tripod provided in Embodiment 1 of the present invention.
Figure 3:
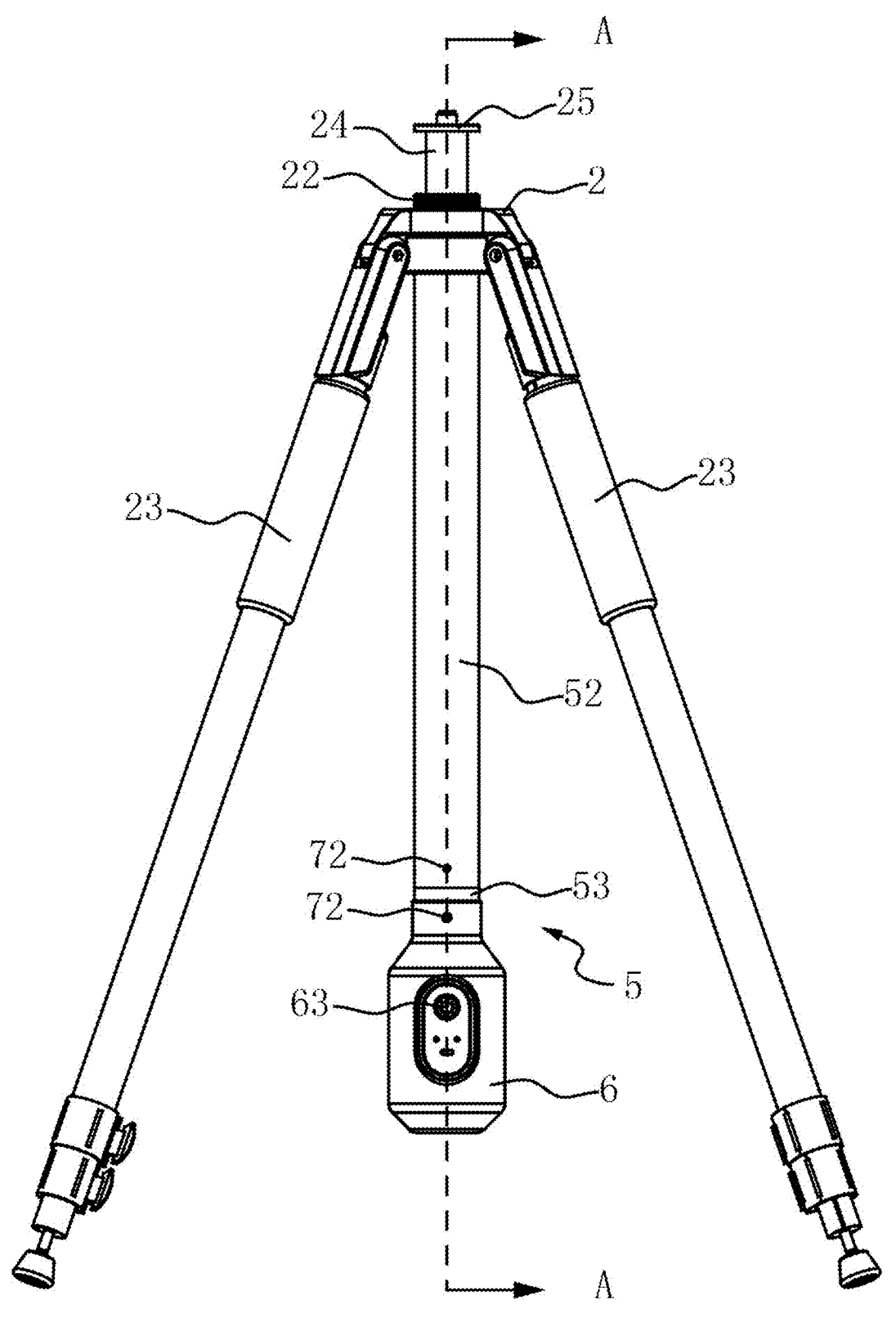
FIG. 3 is a front view of the electric lifting tripod shown in FIG. 2, in which the lifting part (laser) is at a lower position.
Figure 4:
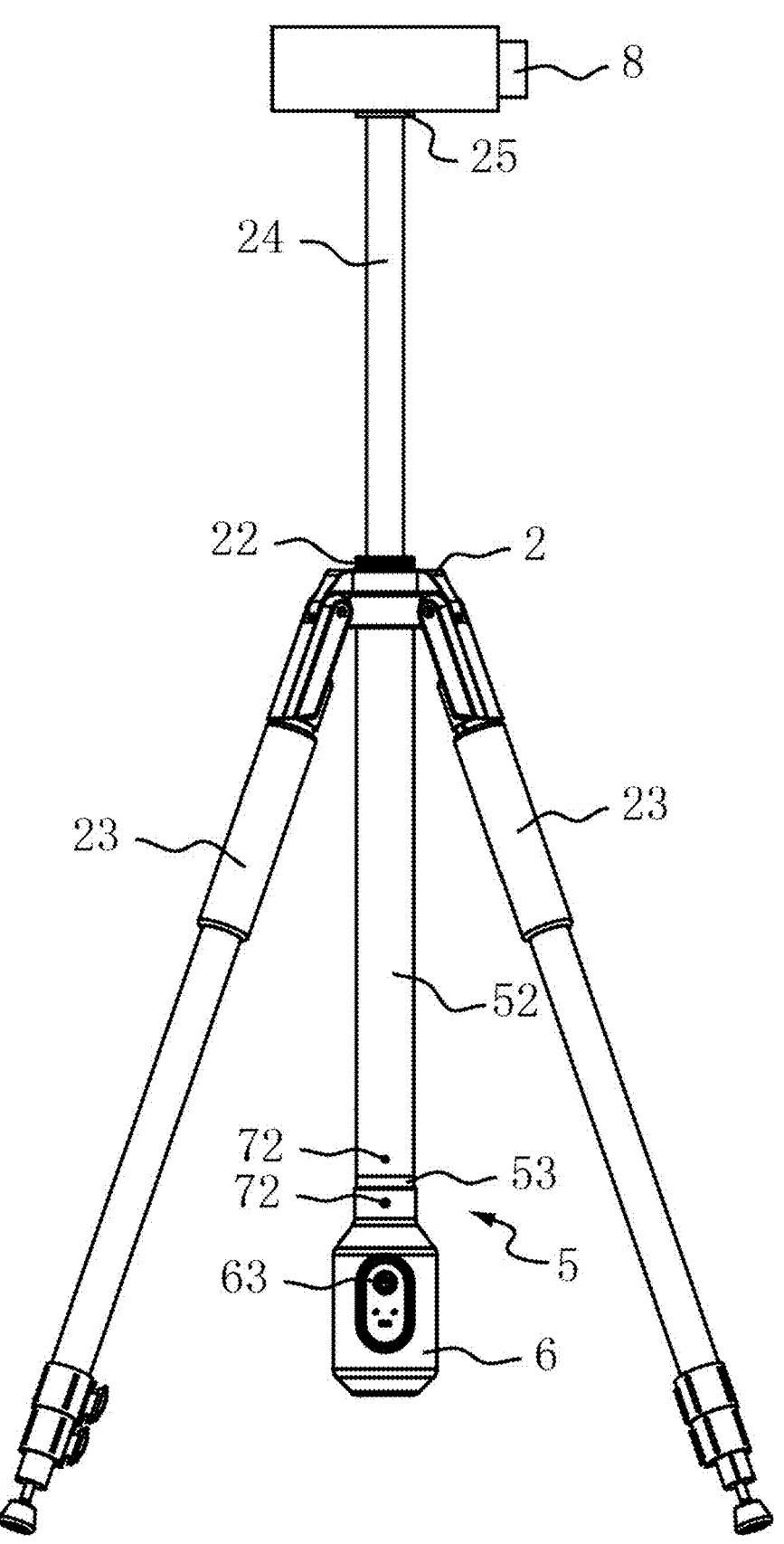
FIG. 4 is a front view of the electric lifting tripod shown in FIG. 2, in which the lifting part (laser) is at a higher position.

This embodiment provides an electric lifting tripod (hereinafter referred to as the electric tripod or tripod) for automatic laser tracking, including a controller 41, a lifting part 24 for supporting a laser instrument 8, a motor 3 connected to the lifting part 24, a base 2, and multiple retractable legs 23, as shown in FIGS. 2-4. Each leg 23 is rotatably connected to the base 2 for folding and unfolding. In implementation, the legs 23 can be conventional retractable legs. In implementation, each leg 23 is evenly distributed along the circumference of the base 2 for more stable and reliable support. The number of legs 23 can be determined according to actual needs. For example, as shown in FIG. 2, the base 2 is connected to three legs 23 that are evenly distributed along the circumference of the base 2.

In implementation, the controller 41 (FIG. 5) is connected (e.g., electrically) to the motor 3. The controller 41 can comprise a conventional control circuit, microprocessor (which may be embedded), or programmable logic device or controller (PLD or PLC). Similarly, in implementation, the lifting part 24 can also adopt a rod-shaped structure. To reduce weight, the lifting part 24 can adopt a long strip structure to allow for lifting over a larger range. For example, in implementation, the lifting part 24 can adopt a solid rod or an internally hollow sleeve structure, as shown in FIGS. 2 and 3, that helps to reduce the weight of the lifting part 24 and improve stability.

In implementation, the base 2 can be a one-piece molded component or a combination component comprising multiple parts, as shown in FIGS. 2 and 3. In implementation, the base 2 includes an adapter hole 21 that passes through the base 2 (e.g., through both the upper and lower ends or surfaces of the base 2). The size of the adapter hole 21 is larger than the size (e.g., the outer diameter or width) of the lifting part 24, so that the upper end of the lifting part 24 can extend above the base 2 through the adapter hole 21, as shown in FIG. 2. At the same time, in order to facilitate the connection of the laser instrument 8, a gimbal 25 is on the lifting part 24 (e.g., an uppermost surface of the lifting part 24), as shown in FIG. 2, so that the laser instrument 8 can be connected to the tripod through the gimbal 25, which is very convenient.

In practice, the motor 3 is connected to the transmission mechanism, and the transmission mechanism is connected to the lifting part 24. Thus, the motor 3 can drive the lifting part 24 to move vertically, thereby moving the laser instrument 8 mounted on it vertically, so as to adjust the position of the laser instrument 8 in the vertical direction and make it easier to cooperate with the receiver 9.

Figure 5:
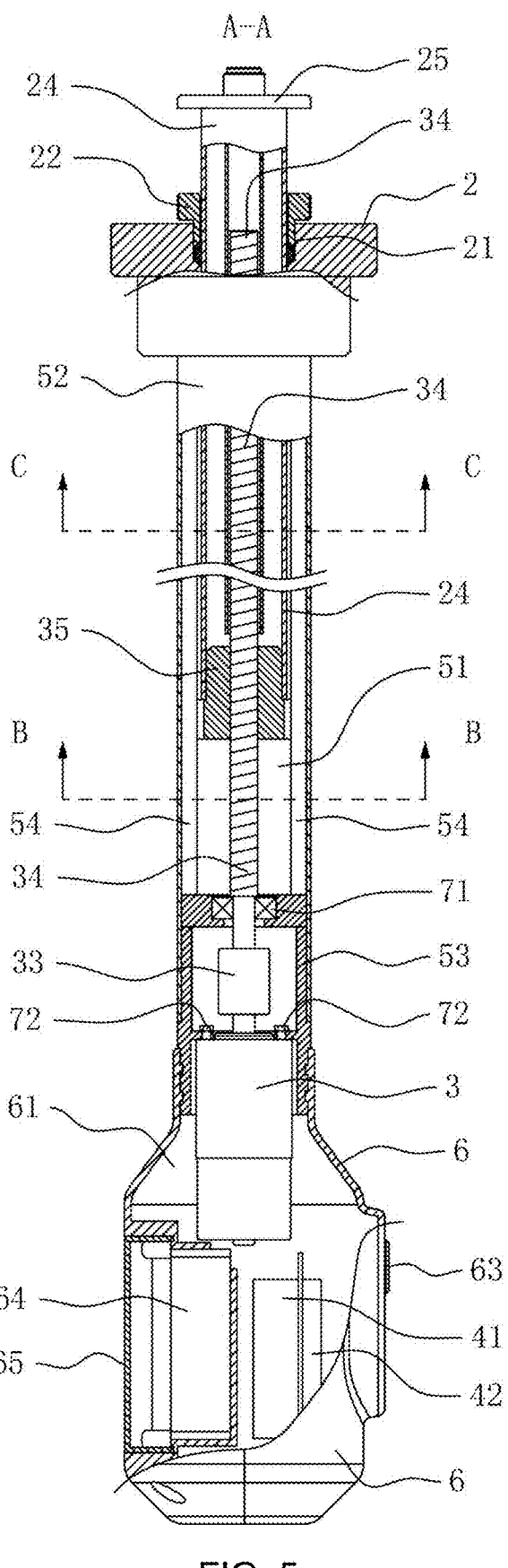
FIG. 5 is a cross-sectional view along the line A-A in FIG. 3.
Figure 6:
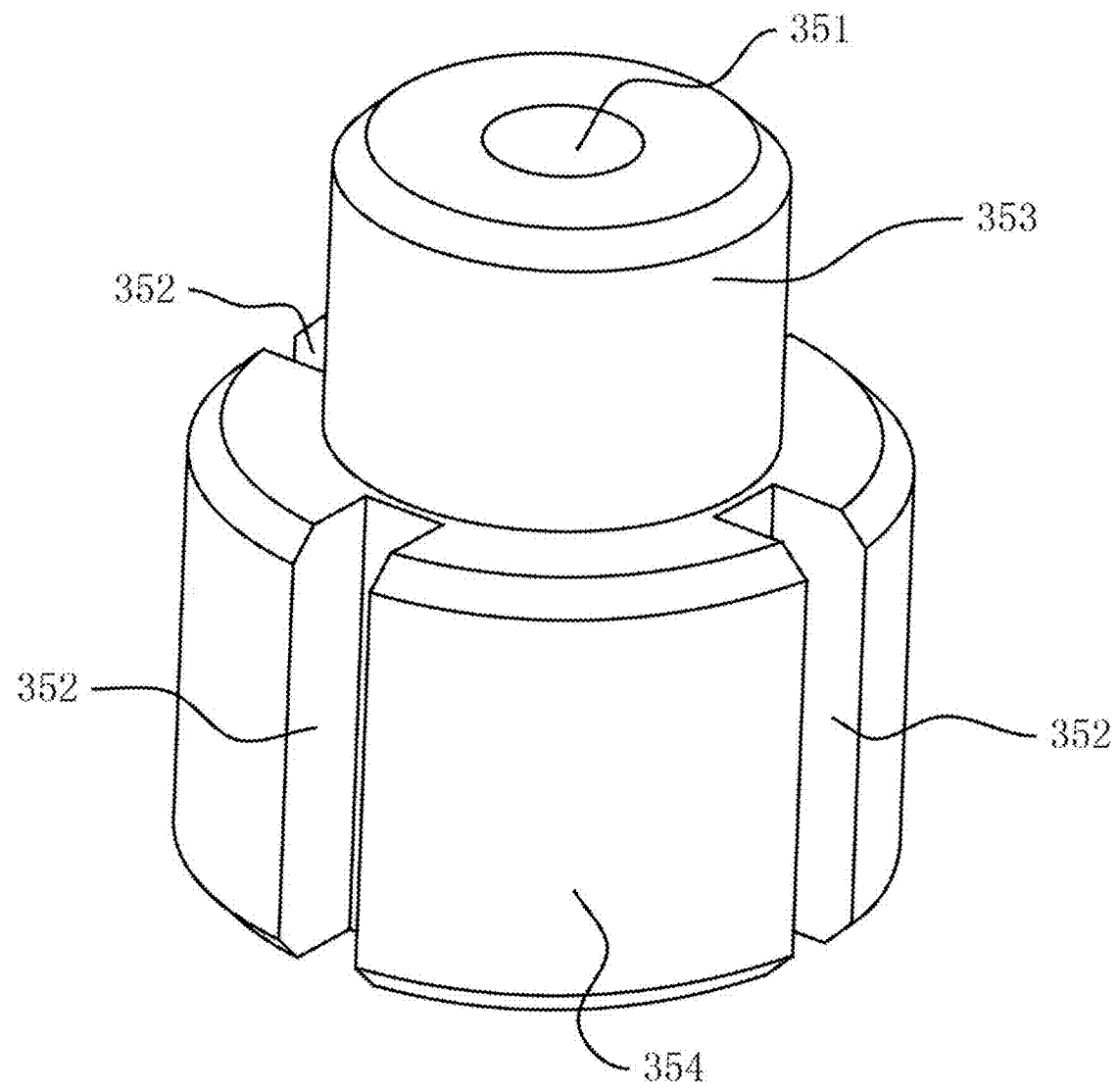
FIG. 6 is a schematic diagram of a nut.
Figure 7:
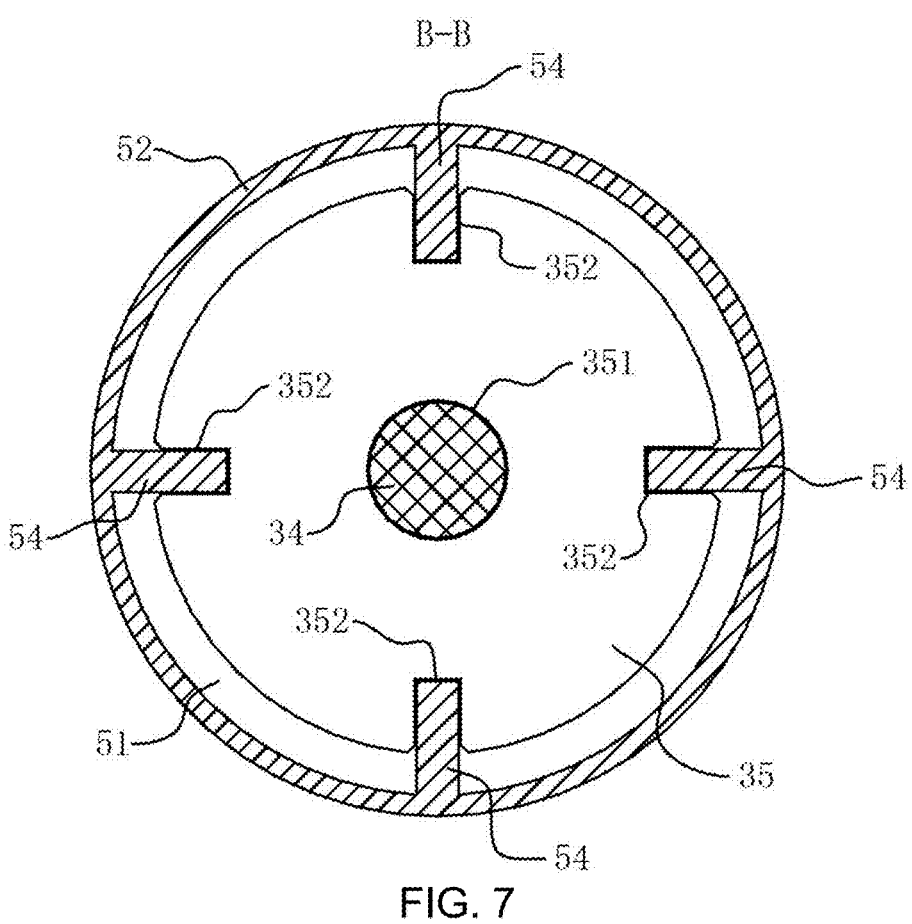
FIG. 7 is a view into the interior of the electric lifting tripod shown in FIG. 2 from the line B-B in FIG. 5.

In this embodiment, the transmission mechanism comprises a lead screw and nut transmission mechanism, as shown in FIGS. 5-7. The lead screw and nut transmission mechanism includes a lead screw 34 and a nut 35. The lead screw 34 has an external thread, and the nut 35 has a threaded hole 351 adapted to the lead screw 34 (e.g., the threaded hole 351 mates with the lead screw 34). The nut 35 is threadedly connected to the lead screw 34 through the threaded hole 351, as shown in FIGS. 5 and 7. The lifting part 24 is connected to the nut 35 for synchronous lifting and lowering. The motor 3 is connected to the lead screw 34 to rotate the lead screw 34, thereby moving the nut 35 and the lifting part 24 vertically (e.g., up and down) synchronously along the lead screw 34, ultimately achieving the purpose of moving the gimbal 25 vertically (e.g., up and down). This not only achieves the purpose of adjusting the position of the laser instrument 8 in the vertical direction, but also, compared to the traditional gear and rack transmission mechanism, the lead screw and nut transmission mechanism configured in the electric tripod effectively improves the transmission accuracy, thus improving the measurement accuracy. Furthermore, it facilitates automatic reverse locking after reaching the target position, ensuring that the laser instrument 8 can be more stably and reliably maintained at the target position, thereby facilitating more stable and reliable measurement.

More specifically, as shown in FIGS. 2-8, the electric tripod also includes a suspension assembly 5 and a shell 6 with a second internal cavity 61. The suspension assembly 5 has a first internal cavity 51, extending through both the upper and lower ends of the suspension assembly 5. During assembly, the upper end of the suspension assembly 5 is connected to the base 2, as shown in FIGS. 2 and 5, and the adapter hole 21 is connected (e.g., open) to the first internal cavity 51. The lead screw 34 and the nut 35 are in the first internal cavity 51, and the lower end of the lifting part 24 extends into the first internal cavity 51 through the adapter hole 21 and connects with the nut 35 in the first internal cavity 51, as shown in FIGS. 2 and 5. At the same time, the upper end of the lifting part 24 can extend above the base 2 (e.g., through the adapter hole 21) to support the gimbal 25 or laser instrument above the base 2. In implementation, the suspension assembly 5 can be a one-piece molded component. For example, the suspension assembly 5 includes a cylindrical outer sleeve 52 surrounding the first internal cavity 51, as shown in FIG. 5. The upper end of the outer sleeve 52 is connected to the base 2. The outer sleeve 52 can be a one-piece molded tube. In implementation, the suspension assembly 5 can also comprise multiple parts (e.g., formed by segmented molding or processing). For example, the suspension assembly 5 may include a cylindrical outer sleeve 52 and a docking cylinder 53 connected to the lower end of the outer sleeve 52, as shown in FIGS. 2-5. The motor 3 can be mounted on or in the docking cylinder 53 using fasteners 72, and the docking cylinder 53 can be inserted in and/or connected to the lower end of the outer sleeve 52 (e.g., by compression fitting). The outer sleeve 52 and the docking cylinder 53 are coaxial, and together they may form or define a lowermost end of the first internal cavity 51, as shown in FIG. 5. This facilitates the separate manufacturing of the outer sleeve 52 and the docking cylinder 53, and also facilitates the installation and disassembly of the motor 3.

During implementation, the central axis of the suspension assembly 5 is coaxial with the central axis of the first internal cavity 51, and the central axis of the first internal cavity 51 is coaxial with the central axis of the adapter hole 21. This is conducive to ensuring that the center of gravity of the entire electric tripod is at the geometric center of the electric tripod, thereby improving the stability of the electric tripod.

In this embodiment, the shell 6 is connected to the suspension assembly 5 (or the docking cylinder 53) and suspended below the suspension assembly 5, as shown in FIGS. 2-5, using a screw-type fitting or a tongue-in-groove fitting. The second internal cavity 61 may be connected to or in communication with the first internal cavity 51 (e.g., for assembly and/or wiring). In this embodiment, the second internal cavity 61 of the shell 6 mainly accommodates electronic devices for operating the tripod. For example, the controller 41 is set in the second internal cavity 61 of the shell 6, as shown in FIG. 5. In practice, the motor 3 can be in the suspension assembly 5 or the shell 6, or a part of the motor 3 can be in the suspension assembly 5 and the remaining part in the shell 6, as shown in FIG. 5. This not only saves space and makes the structure of the entire electric tripod more compact, but also facilitates assembly and wiring operations. In addition, it also lowers the position of the motor 3, which is beneficial to the stability of the electric tripod.

As shown in FIGS. 2-5, the motor 3 is suspended from suspension assembly 5. The output shaft of the motor 3 is coaxial with the lead screw 34, placing the motor 3 away from the base 2. This lowers the center of gravity of the entire electric tripod, improving its stability. Furthermore, coaxiality between the output shaft of the motor 3 and the lead screw 34 enhances the stability of the lead screw 34 during rotation, facilitates higher precision transmission, and enables automatic measurement. In practice, the motor 3 can be fixed to the lower end of the suspension assembly 5, as shown in FIG. 5, placing the motor directly below the gimbal 25. Correspondingly, the lower end of the lifting part 24 is connected to the nut 35, and the lifting part 24 and the nut 35 are coaxial, facilitating installation and disassembly.

In practice, the nut 35 may comprise a small-diameter collar 353 and a large-diameter collar 354, as shown in FIG. 6. The small-diameter collar 353 and the large-diameter collar 354 are coaxial with the threaded hole 351, respectively. The small-diameter collar 353 is inserted into the lower end of the lifting part 24, as shown in FIGS. 5 and 6. The lower end of the lifting part 24 abuts against the large-diameter collar 354. This configuration ensures that the lifting part 24 and the nut 35 are coaxial, so that the lifting part 24 can move more smoothly, thereby effectively avoiding the shaking of the lifting part 24 and improving the measurement accuracy.

Figure 9:
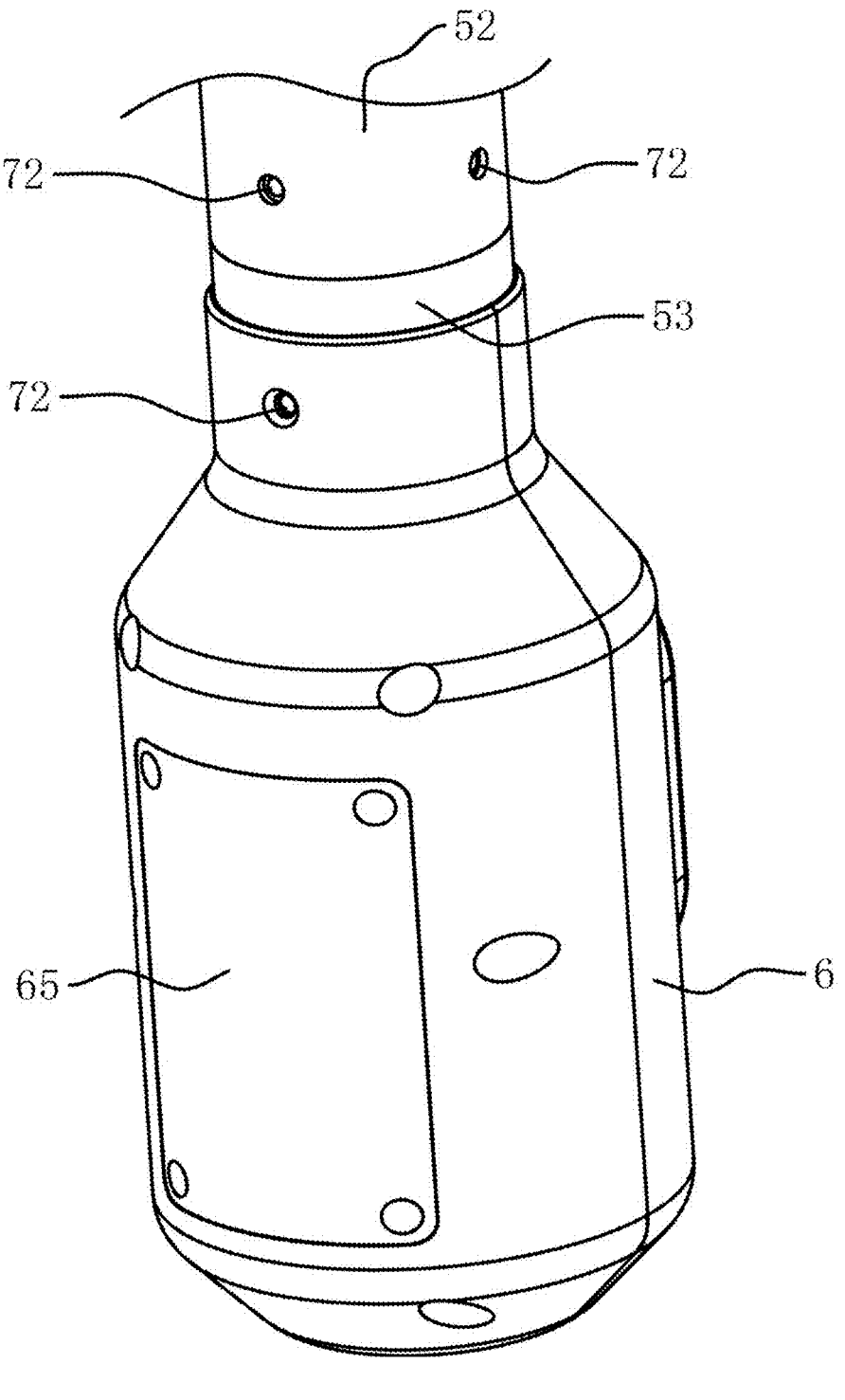
FIG. 9 is a partial structural diagram of the shell of the electric lifting tripod shown in FIG. 2.

In a specific embodiment, the lead screw 34 is in the suspension assembly 5 and coaxial with the suspension assembly 5. The lead screw 34 is connected to the suspension assembly 5 via a bearing 71, as shown in FIG. 5. The upper end of the lead screw 34 can extend to a position close to the base 2, and the lower end of the lead screw 34 can be connected to the output shaft of the motor 3 via a transmission structure such as a flange or a coupling 33, as shown in FIG. 5. The motor 3 can be detachably connected to the suspension assembly 5 (e.g., an outer sleeve 52 or a docking cylinder 53) via fasteners 72, such as bolts or screws. As shown in FIG. 5, the shell 6 can be detachably connected to the lower end of the suspension assembly 5 (e.g., an outer sleeve 52 or a docking cylinder 53) via a screw-type, ring-type or tongue-in-groove fitting. In one implementation, the shell 6 can be integrally formed. In this case, the shell 6 may include a threaded hole (not identified), and the lower end of the suspension assembly 5 or the docking cylinder 53 may include an external thread, so that the shell 6 can be suspended from the suspension assembly 5 or the docking cylinder 53 through the engagement of the threaded hole and the external thread (e.g., by screwing the shell 6 onto the suspension assembly 5 or the docking cylinder 53). In practice, the shell 6 can comprise at least two sub-shells. For example, as shown in FIGS. 5 and 9, the shell 6 includes sub-shells that are spaced apart and opposite to each other. The two sub-shells are connected together (e.g., by fasteners, not shown) and are also tightly held at the lower end of the suspension assembly 5, as shown in FIGS. 5 and 9.

To prevent the nut 35 from rotating synchronously with the lead screw 34, various implementation methods are available. For example, the cross-section of the first internal cavity 51 in the suspension assembly 5 can have a square or hexagonal shape. Correspondingly, the outer shape of the nut 35 is constructed to fit the square or hexagonal shape of the first internal cavity 51. The nut 35 and the suspension assembly 5 form a sliding pair in the vertical direction, so that the nut 35 can only be vertically raised and lowered under the drive of the motor 3, and will not rotate synchronously with the lead screw 34. In a preferred embodiment, the suspension assembly 5 is further provided with a guide protrusion 54 for restricting the rotation of the nut 35. For example, the guide protrusion 54 can be oriented vertically on the inner surface of the outer sleeve 52, as shown in FIGS. 5-8. Correspondingly, the nut 35 is constructed with a limiting groove 352 adapted to fit the guide protrusion 54. During assembly, the nut 35 can form a sliding pair with the suspension assembly 5 along the height direction through the cooperation of the guide protrusion 54 and the limiting groove 352, as shown in FIGS. 5-8. This not only limits the movement of the nut 35, ensuring that the nut 35 rises and falls strictly along the vertical direction, thereby improving measurement accuracy, but also prevents the nut 35 from rotating synchronously with the lead screw 34 through the cooperation of the guide protrusion 54 and the limiting groove 352. In this case, the cross-section of the first internal cavity 51 in the suspension assembly 5 can be a circle, and the suspension assembly 5 can preferably be cylindrical, as shown in FIGS. 5-8.

In implementation, the guide protrusion 54 and the limiting groove 352 can have various cooperative embodiments. For example, the guide protrusion 54 can be a protrusion for guiding the nut 35, as shown in FIGS. 5-8, and be configured along the length direction of the suspension assembly 5. Correspondingly, the limiting groove 352 can be a groove limiting rotation of the nut 35, adapted to the guide protrusion 54. The limiting groove 352 is on the outer surface of the nut 35. The limiting groove 352 can preferably be on the large-diameter collar 354, rather than on the small-diameter collar 353. For example, the limiting groove 352 can be on or in the outer wall of the large-diameter collar 354, as shown in FIGS. 5-6. The guide protrusion 54 engages with the limiting groove 352 and forms a sliding pair with the limiting groove 352. This embodiment not only has a simple structure, but also allows the guide protrusion 54 and the suspension assembly 5 to be an integral unit, which is conducive to manufacturing efficiency and ensuring accuracy.

Figure 8:
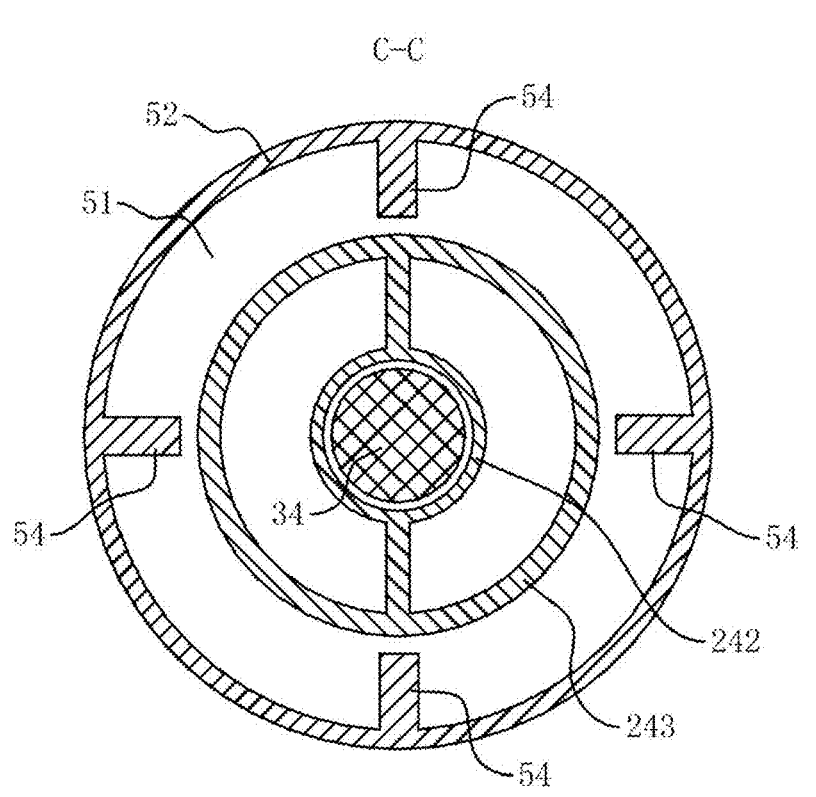
FIG. 8 is a cross-sectional view along the line C-C in FIG. 5.

To improve the transmission accuracy of the lead screw 34, in a further embodiment, the lifting part 24 may include an inner cylinder 242 and an outer cylinder 243 connected to the inner cylinder 242, as shown in FIGS. 5 and 8. The inner cylinder 242 and the outer cylinder 243 are coaxial, and the lower end(s) of the inner cylinder 242 and/or the outer cylinder 243 is connected to the nut 35. The inner diameter of the inner cylinder 242 is slightly larger than the outer diameter of the lead screw 34, so that the lead screw 34 is in the inner cylinder 242, but the inner cylinder 242 can move relative to the lead screw 34. This allows the inner cylinder 242 to effectively constrain and limit the radial or lateral displacement of the lead screw 34, preventing large-scale shaking or swaying of the upper end of the lead screw. The outer diameter of the outer cylinder 243 can be configured to fit the first internal cavity 51, so that the outer cylinder 243 and the suspension assembly 5 form a vertical sliding pair, allowing the suspension assembly 5 to maintain the lifting part 24 in a vertical position. The outer diameter of the outer cylinder 243 can also be configured to fit the adapter hole 21, so that the outer cylinder 243 and the adapter hole 21 form a vertical sliding pair, and the adapter hole 21 can function as a guide for the movement of the lifting part 24, which helps the lifting part 24 to always maintain a vertical position. In addition, the outer diameter of the outer cylinder 243 can also be configured to fit the guide piece (or gasket) 22 in the adapter hole 21, as shown in FIGS. 2-5. The outer cylinder 243 and the guide piece 22 form a vertical sliding pair, so that the guide piece 22 can be used as a guide for the movement of the lifting part 24, which helps the lifting part 24 to always maintain a vertical position. In implementation, the guide piece 22 can be conventional, and will not be described in detail here.

In this embodiment, the shell 6 also has an opening and a cover 65 adapted to the opening, as shown in FIGS. 5 and 9. Correspondingly, an installation cavity 64 is also inside the shell 6, where the battery 62 can be placed and configured to power electrical components such as the controller 41 and the motor 3. The cover 65 closes the opening. For example, the cover 65 can be fixed to the shell 6 by fasteners similar to fasteners 72, so that no external power supply is required during field use, making the measurement process simpler and more efficient. With the installation cavity 64, the opening and the cover 65, it is beneficial to protect the battery 62 and facilitate the replacement of the battery 62. In implementation, the battery 62 is preferably a lithium battery.

In this embodiment, the operating component 63 can be configured on one side of the shell 6, as shown in FIGS. 2-5, so that the operating component 63 is in a lower position, making it easier for personnel to operate.

In this embodiment, the motor 3 can preferably be a planetary motor 3. In the electric tripod in Embodiment 1, the motor 3 realizes the lifting and lowering of the lifting part 24 through the meshing transmission of a worm, a turbine and a rack. However, in practice, there are problems such as large size, poor transmission accuracy, low thrust and high manufacturing cost. In the electric tripod provided in this embodiment, the motor 3 realizes the lifting and lowering function of the lifting part 24 through the transmission of the lead screw and nut mechanism. Compared with the electric tripod in the prior art (or the electric tripod in Embodiment 1), the electric tripod provided in this embodiment has the advantages of smaller size, greater thrust, significantly improved transmission accuracy and much lower manufacturing cost. This makes the transmission accuracy and stability of the measurement system based on this electric tripod significantly improved and the manufacturing cost greatly reduced, which better meets market demand.

For ease of operation, in a further embodiment, the shell 6 is also provided with an operating component 63, as shown in FIGS. 2 and 5. The operating component 63 is connected to the controller 41, allowing the operator to control whether the battery 62 provides power and/or the motor 3 starts and/or stops, which is very convenient. In practice, the operating component 63 may be a button, knob, or touch screen on the shell 6.

Figure 10:
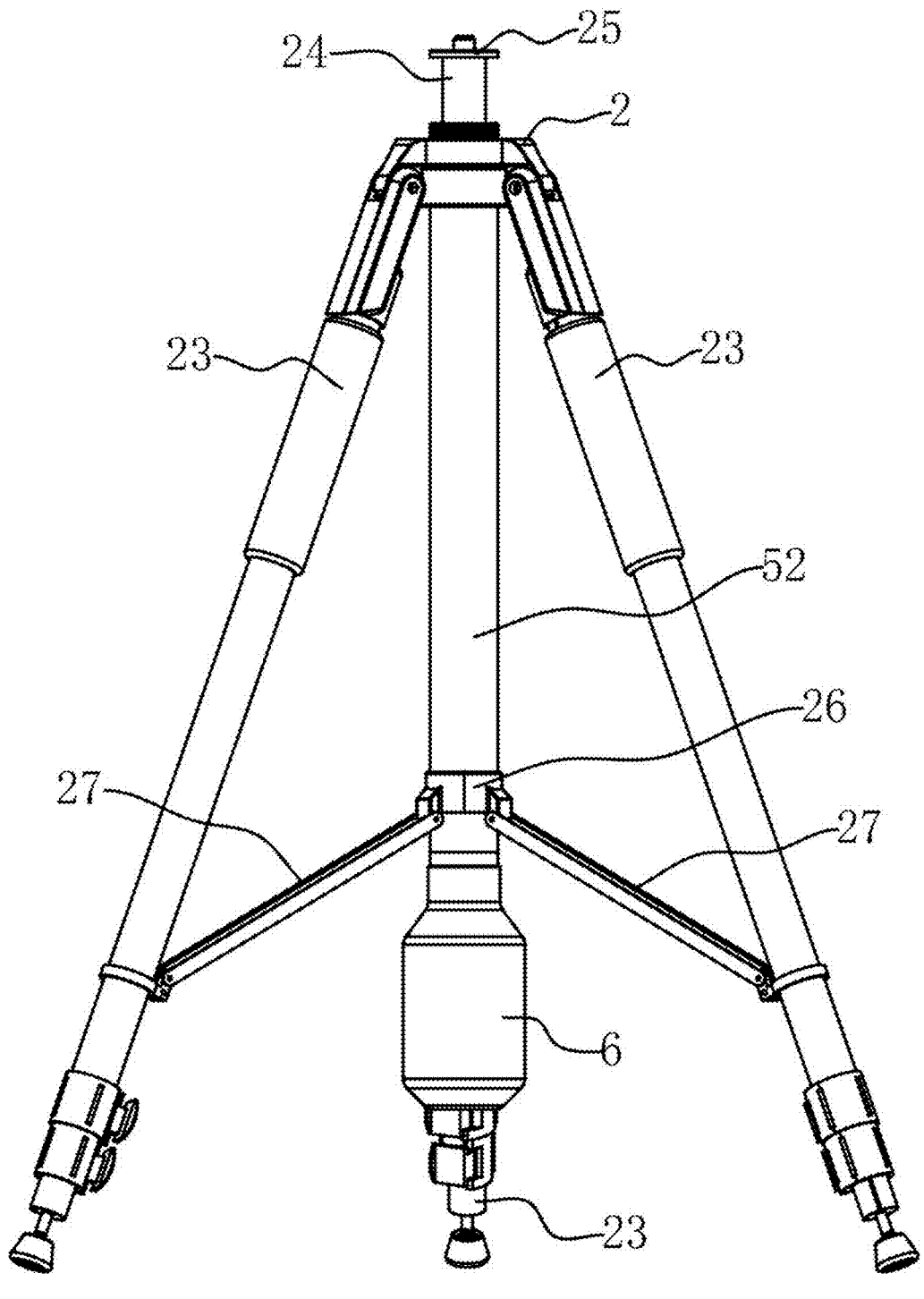
FIG. 10 is a front view of another electric lifting tripod provided in Embodiment 1 of the present invention.

In a further embodiment, as shown in FIG. 10, a sliding ring 26 is configured around the outer sleeve 52, and a support rod 27 is rotatably connected to the lower end of the legs 23. The support rod 27 is rotatably connected to the sliding ring 26 (and, optionally to a corresponding leg 23). By sliding the sliding ring 26, the legs 23 can be extended or retracted. Alternatively. pulling the legs 23 apart or pushing the legs 23 together causes the sliding ring 26 to slide along the outer sleeve 52. In actual use, the sliding ring 26 uniformly controls the extension and retraction of all legs 23, ensuring that the extension of each leg 23 is consistent, keeping the center of gravity always along the outer sleeve 52, which is in the center of the tripod, thereby further improving the stability of the legs 23.

Embodiment 2

Figure 11:
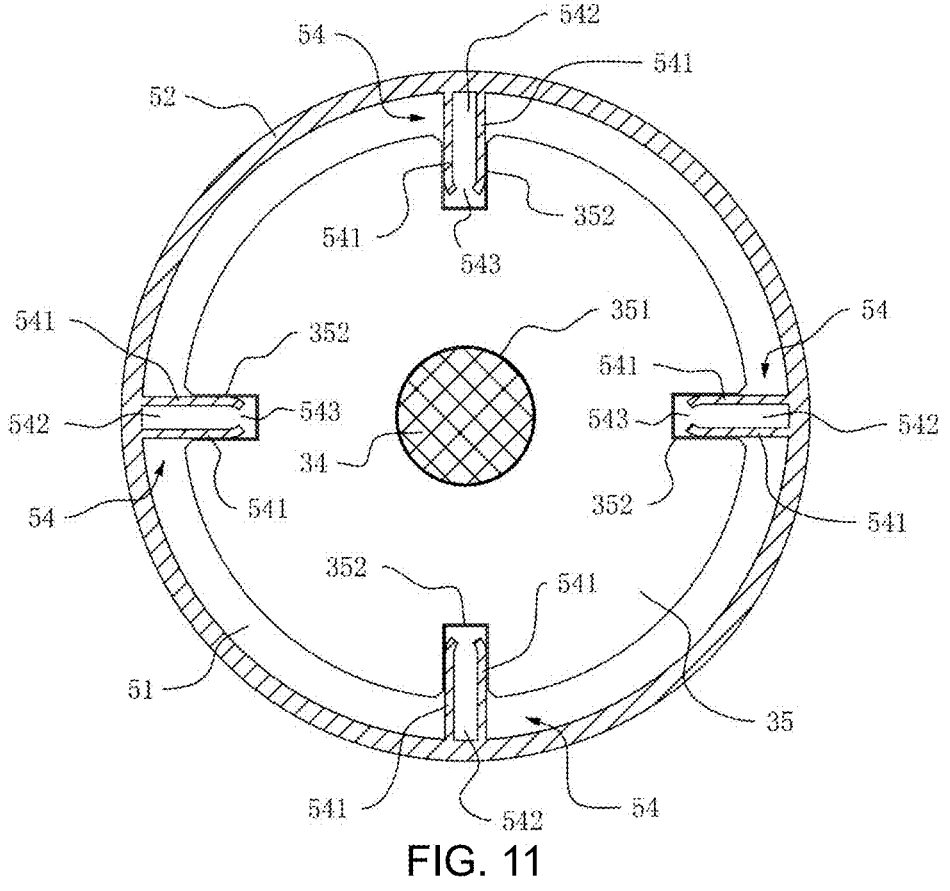
FIG. 11 is a cross-sectional schematic diagram of the nut in an electric lifting tripod provided in Embodiment 2 of the present invention.

To address the issue of facilitating uninterrupted vertical cable routing, the main difference between this Embodiment 2 and the aforementioned Embodiment 1 is that the electric lifting tripod provided in this embodiment includes two opposing baffles 541 in the guide protrusion 54, as shown in FIG. 11. A line passage 542 is formed between the two baffles 541, and an opening 543 is formed on the side or end of the two baffles 541 away from the suspension assembly 5. The opening 543 is connected or open to the line passage 542. This not only allows for convenient vertical cable routing through the line passage 542 in the guide protrusion 54 without internal cable clutter or tangling, but also, through the guiding cooperation between the guide protrusion 54 and the limiting groove, the entire structure becomes more compact and simplified, while effectively constraining the wires within the line passage 542 and preventing the wires from interfering with the lifting process of the tripod.

In implementation, the baffles 541 can be straight plates. In a further embodiment, the spacing of the openings 543 is smaller than the maximum spacing between the baffles 541, which can form a necking at the openings 543 to prevent the wires in the line passage 542 from coming out through the openings 543, thereby avoiding interference between the wires and the internal parts of the suspension assembly 5.

In one embodiment, the inner ends of the baffles 541 can be bent inward at the openings 543 to from the necking, as shown in FIG. 11. Alternatively, the openings 543 can be formed using an inwardly facing flange at the inner ends of the baffles 541. Both bending the baffles 541 inward or configuring the baffles 541 in a special way can reduce the spacing of the opening 543. In practice, the entire suspension assembly 5 can be a single molded piece made from aluminum.

Embodiment 3

In prior art measurement systems, operators typically control the raising and lowering of an electric tripod manually via remote control. During measurement, as the laser beam projected by the laser instrument gradually approaches the receiver and its detector detects the laser, the receiver intermittently alerts the operator using an alarm. When the alarm becomes continuous, it indicates that the laser has reached the predetermined position. At this point, the operator uses the remote control to stop the raising and lowering mechanism of the tripod, thus halting the laser's position and achieving the measurement or calibration purpose. This existing method requires not only the operator to determine if the laser has reached the predetermined position but also to manually operate the remote control to stop the tripod's raising and lowering. Measurement accuracy is heavily influenced by the operator's experience and reaction speed, significantly impacting accuracy and resulting in low precision. Furthermore, the reliance on manual intervention in multiple stages makes the measurement process cumbersome. Additionally, it complicates the existing receiver's alerting module (e.g., requiring intermittent alarms followed by a continuous alarm) to better guide the operator. Therefore, a more convenient, accurate, and cost-effective solution for measurement or calibration is urgently needed.

Figure 12:
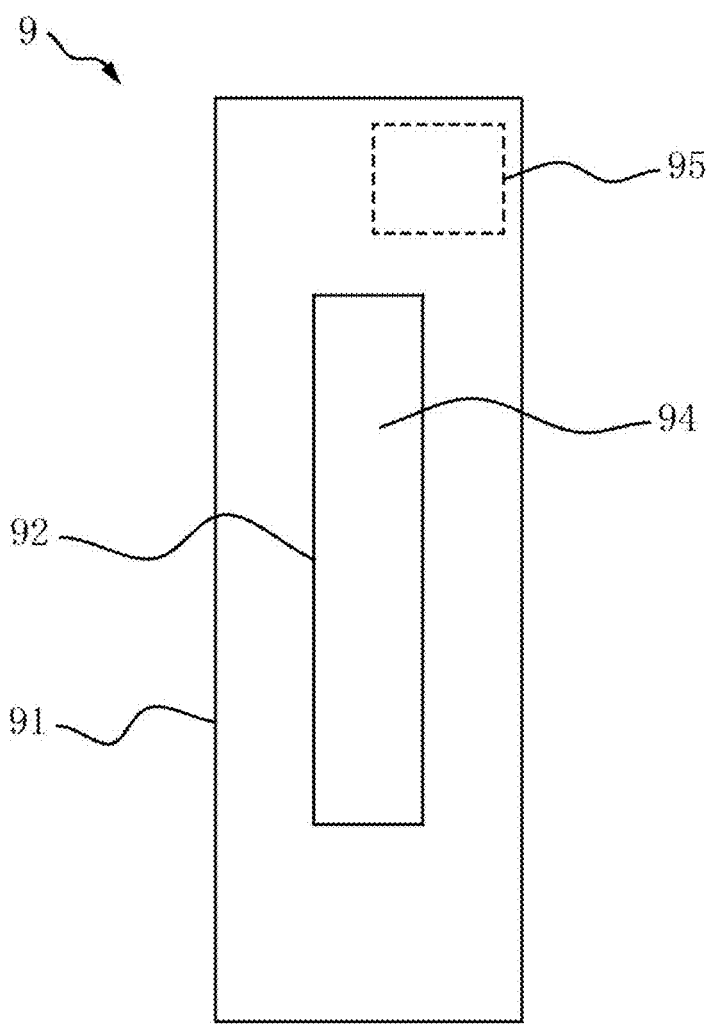
FIG. 12 is a front view of a receiver in the measurement system provided in Embodiment 3 of the present invention.
Figure 13:
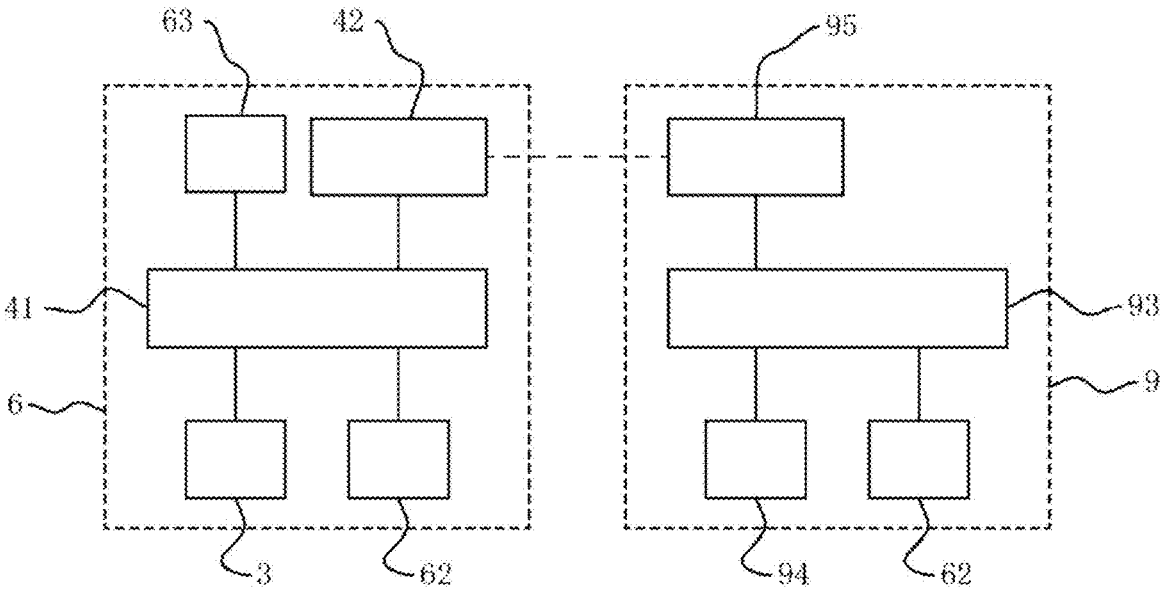
FIG. 13 is a system block diagram of a measurement system provided in Embodiment 3 of the present invention.

To address this technical problem, this embodiment provides a measurement system based on the aforementioned electric lifting tripod, including the electric lifting tripod (as in Embodiment 1 or Embodiment 2), a receiver 9, and a laser instrument 8 for generating laser beam, as shown at least in FIGS. 12 and 13. The receiver 9 includes a processor 93 and a detector 94 for detecting laser beam. The detector 94 is connected to the processor 93. The processor 93 can comprise one or more existing control circuits, microprocessors (which may be embedded in a chip having additional functionality, such as a system-on-a-chip), or PLDs/PLCs, etc. The detector 94 can be a conventional laser detection detector (e.g., photodetector). In implementation, the receiver 9 also includes a housing 91, as shown in FIG. 12. The housing 91 has a window 92 allowing the laser beam to pass through to the detector 94. The processor 93 and the detector 94 are within the housing 91, with the detector 94 corresponding to the window 92. In implementation, the receiver 9 may also include a battery (similar or identical to battery 62) within the housing 91 to power the processor 93, the detector 94, and other electrical components in the receiver 9.

In this system, the receiver 9 also includes a first communication module 95, as shown in FIGS. 12 and 13. The first communication module 95 is connected to the processor 93, so that the receiver 9 can at least send or broadcast signals through the first communication module 95. The electric tripod also includes a second communication module 42 adapted to (e.g., communicate with) the first communication module 95, as shown in FIGS. 12 and 13. The second communication module 42 is connected to the controller 41, so that the electric tripod can at least receive signals through the second communication module 42. In practical use, the first communication module 95 and the second communication module 42 are coupled, enabling the receiver 9 and the electric tripod to communicate with each other. When the detector 94 of the receiver 9 detects the laser beam, the receiver 9 can send a signal to the electric tripod through the first communication module 95 to the second communication module 42 in the housing 6 of the electric tripod. The signal may cause the controller 41 to raise, lower or level the lifting part 24 (e.g., instruct the motor 3 to rotate the lead screw 34 clockwise or counterclockwise, increase or decrease the rotational rate of the output shaft of the motor 3, etc.), or stop the motor 3. After receiving the signal, the electric tripod can control the motor 3 to move the lifting part 24 and to stop rotating in a timely manner according to preset settings, so that the laser instrument 8 stops rising and falling, achieving the purpose of measurement or calibration. This allows the laser instrument, the electric tripod, and the receiver 9 to form a high-precision automatic laser tracking function. The entire process from detecting the laser signal to the controller 41 controlling the motor 3 to stop is automatically completed by the cooperation of the receiver 9 and the electric tripod. Not only is the response speed significantly higher than that of manual control, which can significantly improve the measurement accuracy, but the entire measurement process is also shorter, which is beneficial to improving measurement efficiency.

In implementation, the first communication module 95 and the second communication module 42 can have various cooperative implementations. For example, the first communication module 95 may include a first wireless communication module, and correspondingly, the second communication module 42 includes a second wireless communication module adapted to (e.g., using a same communication protocol as) the first wireless communication module. The wireless communication modules can have various implementations. For example, they may be Bluetooth modules, Wi-Fi modules, ZigBee modules, LoRa modules, NB-IoT modules, 4G communication modules, or 5G communication modules, etc. The first communication module 95 can be housed within the housing 91.

As another example, in implementation, the first communication module 95 may be a first wired communication module, and correspondingly, the second communication module 42 may be a second wired communication module adapted to (e.g., using a same communication protocol as) the first communication module 95. By using mutually compatible wired communication modules for the first communication module 95 and the second communication module 42, the receiver 9 and the electric tripod can be communicatively connected via a communication cable at the measurement site. The wired communication modules may have various implementations. For example, the wired communication modules may be Ethernet modules, serial communication modules, CAN bus modules, or fiber optic communication modules, etc. To facilitate field wiring, in a further embodiment, the wired communication modules may also include a communication interface for connecting the communication cable. In implementation, the communication interface in the receiver 9 can be constructed in the housing 91 of the receiver 9, and correspondingly, the communication interface in the electric tripod can be located in the base 2 or the shell 6 of the electric tripod, etc., so as to quickly connect the communication cable in the field, which is very convenient. It is understandable that the communication cable is compatible with the type of wired communication module. For example, when the wired communication module uses an optical fiber communication module, the communication interface can be an optical fiber interface, and the corresponding communication cable is an optical fiber cable; when the wired communication module uses a serial communication module, the communication interface can be an RS-485 interface, and the corresponding communication cable can be a twisted pair cable.

In implementation, the laser instrument 8 can be any conventional laser instrument that can emit laser light (including a laser beam or a laser surface emission), including but not limited to a laser level, a laser sweeping device, a laser line projector, etc., and the laser instrument 8 is mounted on the electric tripod, specifically on the gimbal 25 on the lifting part 24, so that the position of the laser instrument 8 in the vertical direction can be adjusted using the electric tripod.

In practice, the second communication module 42 can be in the suspension assembly 5 or in the shell 6. This facilitates the installation and layout of the second communication module 42, allows the battery in the shell 6 to power the second communication module 42, and keeps the second communication module 42 further away from the laser instrument 8 above, effectively preventing the laser instrument 8 from interfering with the communication of the second communication module 42, which is conducive to more stable communication.

The above description is merely a specific embodiment of the present invention, but the scope of protection of the present invention is not limited thereto. Any variations or substitutions that can be easily conceived by those skilled in the art within the scope of the technology disclosed in the present invention should be included within the scope of protection of the present invention.

What is claimed is:

1. An electric lifting tripod for laser automatic tracking, comprising a base, a plurality of extendable legs, a suspension assembly, a lifting part, a transmission mechanism and a motor, wherein:

each of the plurality of extendable legs is rotatably connected to the base, the base comprises an adapter hole therethrough, the suspension assembly comprises an upper end connected to the base, a lower end, a first internal cavity through the upper and lower ends, a guide protrusion, a first baffle, a second baffle opposite to the first baffle, a line passage between the first and second baffles, and a second opening on sides of the first and second baffles away from the suspension assembly, wherein the adapter hole is connected to the first internal cavity, and the second opening is connected to the line passage, the lifting part has an upper end that extends above the base through the adapter hole, and is configured to support a laser instrument, the lifting part has a lower end that extends into the first internal cavity through the adapter hole and is connected to the transmission mechanism, the transmission mechanism is connected to the motor and comprises a lead screw and nut transmission, wherein the lead screw and nut transmission mechanism includes a rotatable lead screw and a nut, the lead screw is in the suspension assembly, the nut has a threaded hole adapted to mate with the lead screw, the nut is threadedly connected to the lead screw through the threaded hole, the nut is in the first internal cavity and connected to the lifting part, the motor is connected to a lower end of the lead screw and is configured to rotate the lead screw, the guide protrusion is configured to limit rotation of the nut, the nut comprises a limiting groove adapted to the guide protrusion, and the guide protrusion and the limiting groove constitute a first vertically sliding pair, and the motor is fixed to the lower end of the suspension assembly and is configured to move the lifting part up and down.

2. The electric lifting tripod of claim 1, wherein the motor has an output shaft that is coaxial with the lead screw, and the lead screw is coaxial with the suspension assembly.

3. The electric lifting tripod of claim 1, wherein the lower end of the lifting part is connected to the nut, and the lifting part and the nut are coaxial.

4. The electric lifting tripod of claim 3, wherein the nut comprises a small-diameter collar and a large-diameter collar, wherein each of the small-diameter collar and the large-diameter collar are coaxial with the threaded hole, and the small-diameter collar is insertable into the lower end of the lifting part.

5. The electric lifting tripod of claim 1, wherein the lifting part includes an inner cylinder and an outer cylinder connected to the inner cylinder, the inner cylinder and the outer cylinder are coaxial, the inner cylinder or the outer cylinder is connected to the nut, the inner cylinder has an inner diameter larger than the an outer diameter of the lead screw, the lead screw is in the inner cylinder, the inner cylinder is configured to radially limit and constrain the lead screw, and the lower end of the lead screw is connected to the suspension assembly through a bearing.

6. The electric lifting tripod of claim 5, wherein:

the outer cylinder and the adapter hole form a second vertically sliding pair.

7. The electric lifting tripod of claim 5, wherein the adapter hole includes a guide piece, the outer diameter of the outer cylinder fits the guide piece, and the outer cylinder and the guide piece form a second vertically sliding pair.

8. The electric lifting tripod of claim 1, further comprising a shell with a second internal cavity, the shell is suspended below the suspension assembly, the second internal cavity is connected to the first internal cavity, and the motor is in the second internal cavity.

9. The electric lifting tripod of claim 8, further comprising a controller inside the shell and connected to the motor, wherein:

the shell has a first opening, a cover adapted to and configured to close the first opening, an installation cavity, and a battery in the installation cavity, configured to power the controller and the motor; and the shell further comprises an operating component connected to the controller, the operating component being selected from a button, a knob, and a touch screen.

10. The electric lifting tripod of claim 1, wherein the guide protrusion is oriented along a length of the suspension assembly.

11. The electric lifting tripod of claim 1, wherein:
the first and second baffles are bent inward at the second opening to form a necking.

12. The electric lifting tripod of claim 1, wherein the suspension assembly includes a cylindrical outer sleeve, and:
the outer sleeve has (i) an upper end connected to the base and (i) an inside cavity.

13. The electric lifting tripod of claim 1, further comprising a gimbal on the lifting part, wherein:
the plurality of legs are evenly distributed along a circumference of the base; and
the suspension assembly includes a cylindrical outer sleeve with a sliding ring outside the outer sleeve, the electric lifting tripod further comprises a support rod rotatably connected to a lower end of each leg, and the support rod is rotatably connected to the sliding ring, wherein sliding the sliding ring extends or retracts the plurality of legs.

14. The electric lifting tripod of claim 1, wherein each of the first and second baffles has an inwardly facing flange at the opening to form the necking.

15. The electric lifting tripod of claim 1, wherein the suspension assembly includes a cylindrical outer sleeve, the outer sleeve has an upper end and a lower end, the suspension assembly further includes a docking cylinder connected to the lower end of the outer sleeve, the upper end of the outer sleeve is connected to the base, the docking cylinder is connected to the lower end of the outer sleeve by fasteners, the outer sleeve and the docking cylinder together form the inside cavity, and the motor is on the docking cylinder.

16. A measurement system, comprising
a laser instrument for generating laser light,
a receiver including a processor, a detector for detecting laser light, and a first communication module, the detector and the first communication module being respectively connected to the processor, and
the electric lifting tripod as described in claim 1, wherein:
the electric lifting tripod further includes a second communication module adapted to the first communication module,
the second communication module is connected to a controller,
the first communication module is communicatively connected to the second communication module, and
the laser instrument is on the electric tripod and configured to adjust a vertical position of the laser instrument.

17. The measurement system of claim 16, wherein the first communication module is a first wireless communication module, and the second communication module is a second wireless communication module adapted to the first wireless communication module.

18. The measurement system of claim 17, wherein each of the first and second wireless communication modules is one of a Bluetooth module, a Wi-Fi module, a ZigBee module, a LoRa module, an NB-IoT module, a 4G communication module, and a 5G communication module.

19. The measurement system of claim 16, wherein the first communication module is a first wired communication module, the second communication module is a second wired communication module adapted to the first wired communication module, and each of the first and second wired communication modules is one of an Ethernet module, a serial communication module, a CAN bus module, and an optical fiber communication module.

20. The measurement system of claim 16, wherein the electric lifting tripod further comprises a shell, the controller is within the shell, and the second communication module is within the suspension assembly or the shell.

* * * * *